March 4, 19 S. S. ORKIN Re. 28,354

BEARING CONSTRUCTION

Original Filed May 25, 1970

INVENTOR

STANLEY S. ORKIN

BY Cushman, Darby & Cushman

ATTORNEYS

United States Patent

Re. 28,354

Reissued Mar. 4, 1975

28,354

BEARING CONSTRUCTION

Stanley S. Orkin, Rockville, Conn., assignor to Kamatics Corporation, Bloomfield, Conn.

Original No. 3,685,878, dated Aug. 22, 1972, Ser. No. 40,200, May 25, 1970. Application for reissue Nov. 13, 1973, Ser. No. 415,492

Int. Cl. F16c *33/04*

U.S. Cl. 308—238 2 Claims

Matter enclosed in heavy brackets [ ] appears in the original patent but forms no part of this reissue specification; matter printed in italics indicates the additions made by reissue.

ABSTRACT OF THE DISCLOSURE

A plain dry bearing consists of two relatively movable members, one providing a rubbing bearing surface made of at least in part a solid organic lubricant material and the other providing a rubbing bearing surface made of a thin ceramic coating on a metal substrate. The ceramic coating is sufficiently thin, less than 0.010 of an inch, that it may deform under load and transfer stresses to the metal substrate, thereby reducing the possibility of fracturing and spalling the coating and producing a bearing having both the low wear property of the ceramic coating and the high load carrying capability of the metal substrate.

[CROSS REFERENCE TO RELATED APPLICATION

Figure 1:
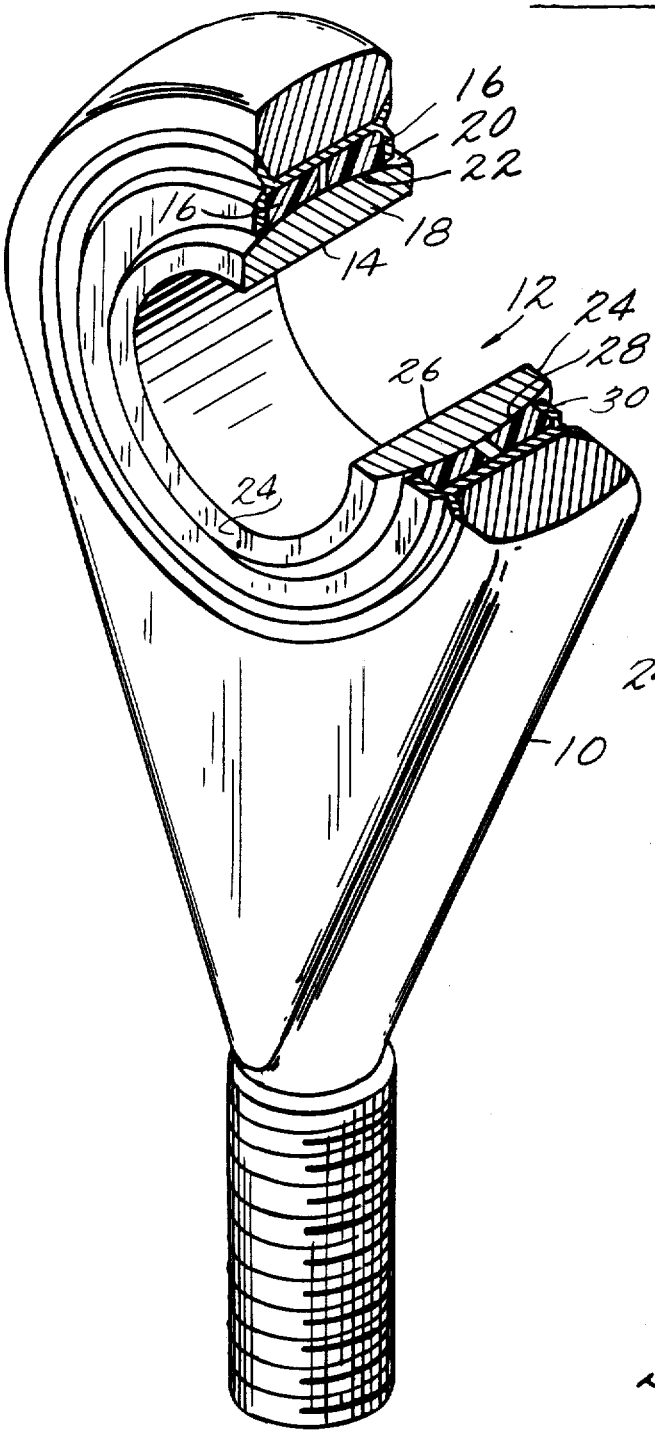

This application is a continuation-in-part of application Ser. No. 792,183, filed Nov. 20, 1968, now U.S. Pat. No. 3,535,005, which in turn is a continuation-in-part application of Ser. No. 582,894, filed Sept. 29, 1966, now abandoned, which in turn is a continuation-in-part of application Ser. No. 542,417, filed Apr. 13, 1966, now U.S. Pat. No. 3,428,374.]

This invention relates to bearings and deals more particularly with an improved plan bearing construction.

The bearing of this invention is in some respects similar to the bearing shown in application Ser. No. 542,417, filed Apr. 13, 1966, now U.S. Pat. No. 3,428,374, and to the bearing shown in copending application Ser. No. 792,183, filed Nov. 20, 1968 and entitled "Bearing Construction." A typical bearing assembly of U.S. Pat. No. 3,428,374 comprises two bearing members having coengaging surfaces which are movable relative to one another. The surface of the first member is made from a compacted blend of amorphous carbon and graphite impregnated with a metal, and the surface of the second member is made from polycrystalline aluminum oxide of at least 99 percent purity by weight having an average grain size of 45 microns or finer and a density of at least 3.80 grams per cubic centimeter. In the bearing construction of application Ser. No. 792,183, the surface of the first member is made at least in part of a solid inorganic lubricant material and the second member comprises a substrate made of metal, such as titanium, a titanium base alloy, a ferrous alloy such as stainless steel, aluminum, or an aluminum base alloy, coated with a ceramic material, to produce a bearing capable of handling higher static and dynamic loads while nevertheless retaining all of the other desirable properties of the bearing described in the proceding application. In contrast, in the bearing construction of this application, the surface of the first member is made at least in part of a solid organic lubricant material, while the second member is essentially the same as the second member of the bearing assembly disclosed in application Ser. No. 792,183.

The general object of this invention is to provide a plain bearing capable of operating without lubrication at a low wear rate and therefore having a prolonged service life.

A further object of this invention is to provide a bearing construction of the foregoing character capable of operating satisfactorily over a wide temperature range and in adverse atmospheres.

Other objects of the invention are to provide a bearing of the foregoing character which may be made in a variety of different shapes and forms, having a low static radial load displacement, a low starting torque, corrosion resistance, and requiring no initial wear-in phase.

Other objects and advantages of the invention will be apparent from the following description and from the drawings forming a part hereof.

The drawings show preferred embodiments of the invention and such embodiments will be described, but it will be understood that various changes may be made from the construction disclosed, and that the drawings and drescription are not to be construed as defining or limiting the scope of the invention, the claims forming a part of this specification being relied upon for that purpose.

Figure 2:
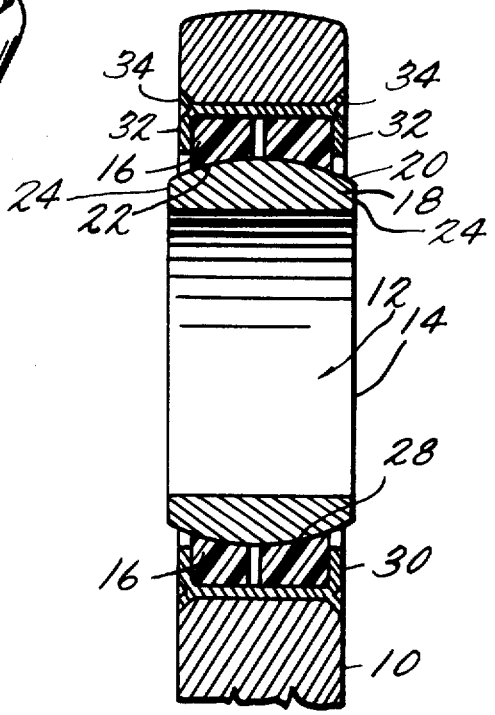

In the drawings:

FIG. 1 is a perspective view of a rod end containing a bearing embodying the present invention, parts of the rod end and bearing being broken away to reveal more clearly the structure of the bearing; and FIG. 2 is a vertical sectional view taken through the rod end of FIG. 1.

The bearing assembly of this inveniton is of the type commonly referred to as a plain bearing. It comprises two bearing members having coengaging surfaces which slide rather than roll relative to one another. In the bearing assembly of this invention, the two coengaging surfaces are made, respectively, from a ceramic material and, at least in part, a solid organic lubricant material. Further, the solid organic lubricant can optionally be compounded with inorganic materials such as graphite, molybdenum disulfide, silver, boron nitrides, antimony, tungsten disulfide and the like. Generally, when present, such inorganic materials constitute about 1 to 75 weight percent of the solid organic lubricant-containing material. The ceramic surface is provided by a thin coating of a ceramic material deposited or otherwise applied to a metal substrate, preferably one having a relatively high tensile strength in comparison to tha of the ceramic, and a high resistance to corrosion such as titanium, a titanium base alloy, a ferrous alloy such as stainless steel, aluminum or an aluminum alloy. The combination of the ceramic surface and the surface containing at least in part a solid organic lubricant results in a drying bearing utilizing the inherent lubricity of the solid organic lubricant material and requiring no additional lubricant.

Bearings using certain solid organic lubricant materials have been known in the prior art. However, the unique combination of one member comprising at least in part a solid organic lubricant material mated with a second member having a ceramic surface and the unexpected advantages secured thereby has not heretofore been suggested. The mating of a bearing member made from, at least in part, a solid organic lubricant material with a bearing element of ceramic on a metal substrate, as fully described hereinafter, provides a bearing assembly which does not exhibit deleterious corrosion characteristics, is not easily susceptible to scoring and does not substantially deteriorate in other ways as present bearings do when subjectted to adverse environments. The bearing assembly of this invention has also been found to be particularly advantageous over prior art bearings in that the metal used as the substrate for the ceramic coated bearing component can be made of one which can be lighter than steel and the use of such lighter metals would not normally be considered feasible in combination with a mated material, at least part of which is a solid organic lubricant. However, it has been observed that the hard ceramic coating is essentially completely compatible with such mating materials and that even though lighter metals employed would normally be expected to wear rapidly, the combination of the ceramic coated metal substrate bearing member and the bearing member containing, at least in part, a solid organic lubricant provides unexpected durability characteristics to the bearing assembly. It has further been found that the ceramic material having controlled finished characteristics provides a superior mating surface for the solid organic lubricant-containing material. In existing bearings utilizing a solid organic lubricant material interposed between a pair of metal bearing members there is, of course, the danger that should one metal bearing member wear through the solid organic lubricant material and contact the other, the two metals will seize, thus causing the bearing to immediately fail. This hazard is essentially eliminated by the present bearing arrangement since the hard ceramic surface of one of the bearing members of this invention does not exhibit any substantial tendency to cause undue or excessive wear of the solid organic lubricant-containing bearing member. But even under highly unusual operating conditions where such wear might possibly occur, the ceramic surface would resist seizing with a backup metal, thus obviating an immediate failure of the bearing assembly.

The high wear resistance of the ceramic material reduces wear of the bearing parts and enables the parts to retain their initial shapes and dimensions over a long service life. The use of the thin ceramic coating on the metal substrate further reduces problems of fracturing, chipping or otherwise breaking or damaging the ceramic material due to its relatively low tensile strength, the high strength metal substrate serving to carry the major portion of the tensile loads. That is, the high strength property of the substrate material is married to the low wear property of the ceramic material to produce a bearing having both low wear and high load carrying capability.

To produce this result it has been found that the ceramic coating must be sufficiently thin to permit slight deformation thereof, as a result of deformation of the substrate under load, without its fracturing, to achieve a transferal of the surface stresses, which would otherwise build up in the coating to the substrate. Furthermore, the tensile strength of the substrate must be within a particular range. If the tensile strength is too low, the substrate will not provide proper support or backing for the coating, and under load, the substrate will deform to too large an extent and cause fracture of the coating. If the tensile strength of the substrate is too high, the substrate will not provide a proper cushioning effect, surface stresses will not be transferred to the substrate and the coating will fracture or otherwise fail as a result of such stresses. In particular, it is found that the tensile strength of the substrate should lie within the range of 35,000 to 250,000 p.s.i. to achieve a proper balance between the tendency of the coating to fracture as a result of deformation and the tendency of the coating to fracture as a result of surface stresses. Also, the coating must have a thickness ranging between 0.0005 to 0.010 inch, a thickness of 0.005 to 0.001 inch being presently preferred.

It had also been found that the use of titanium or a titanium base alloy as the substrate material is particularly desirable insofar as the metal provides an especially good bond with the ceramic coating. In addition, this substrate material is more chemically inert than most other materials which might be used and thereby eliminates or reduces any possibility of corrosion in an adverse atmosphere as might occur with other materials. This substrate material is also lighter in weight than most other materials which might be used and therefore offers the possibility of a weight reduction. It also has the property of retaining its strength when subjected to relatively high temperatures, and therefore permits the construction of a bearing capable of operating at elevated temperatures. Also, and perhaps most important, it has a coefficient of thermal expansion substantially equal to that of the various coating materials which may be used for the ceramic coating and therefore little or no stresses are built up on the coating as a result of differential expansion of the substrate and the coating when operating over a wide temperature range.

The material of the ceramic coating used on the substrate may vary widely; however, it has been found that coating materials made up predominately of one or the other of six specific base compounds provide particularly good results, especially in combination with a substrate of titanium or titanium base alloy. The six base compounds preferred for the coating material are chromium oxide ($Cr_2O_3$), titanium dioxide ($TiO_2$), aluminum oxide ($Al_2O_33$, titanium carbide (TiC), tungsten carbide (WC) and chromium carbide ($Cr_2C$). Each of these compounds may be used either in substantially pure form or in combination with other additives intended to produce a more desirable coating or to facilitate the application of the coating to the substrate. Examples of mixtures which may be used are (80% $Cr_2O_3$+20% NiCr), (TiC+5–20% Ni), (50% WC+35% NiCr+15% NiAl), and (WC+9% Co), where NiCr is made up of 80% Ni and 20% Cr and wherein the percentages given are volume percentages.

The solid organic lubricant material used wholly or in part in the production of the bearing member mated with the above-defined ceramic member can be selected from the group consisting of a solid polyester, polyamide, polyimide, polyphenylene sulfide polyarylsulfone and a polyfluoro-carbon. Representative polyesters include aromatic polyesters such as p-oxybenzoyl polyester which is commercially available, for instance, under the tradename of Ekonol and sold by the Carborundum Co. This polyester material has a density ranging from 1.44–143 g./cc. and a melting point of about 800° F. Polyamides, usefully employed in the present invention, include for instance, Nylon-6 and Nylon-6.6 although it will be recognized that other nylon formulations can also be employed. Aromatic poly-p-phenylene sulfides can also be employed and such polymers can have a molecular weight ranging as high as about 13,000. They are available, commercially, for instance, under the tradename of Ryton by Phillips Petroleum Company, such as product having a specific gravity of about 1.34, a density of about 0.0485 lbs./in.$^3$ and a melting point of about 550° F. Polyfluorocarbons usefully employed in the present invention include polytetrafluoro-ethylene. Included in the polyaryl sulfones suitable for use in the present invention are those which have a molecular weight ranging from about 30,000 to 60,000. One convenient polyarylsulfone is that sold commercially under the tradename Polymer 360–3M Astrel 360 having a specific gravity of 1.36, a density of 0.049 lbs./in.$^3$, a compressive strength at 73° F. of 17,900 p.s.i. and a melting point of about 550° F. Polyimides employed in the present invention are aromatic polyimides which are available commercially under, for instance, the tradenames Vespel SP–1 (DuPont) which has a specific gravity ranging from about 1.41–1.43, a density of about 0.052 lbs./in.$^3$, a compressive strength at 73° F. of about 24,000 p.s.i. and a heat distortion temperature at 264 *p.s.i.* of about 680° F. A modified Vespel SP–1 polyimide is Vespel SP–21 which contains 15 weight percet graphite, has a specific gravity of about 1.51, a density of about 0.0546 lbs./in.$^3$ and a compressive strength at 73° F. of about 18,000 p.s.i. Other polyimides, include one available commercially as XP1–182 by American Cyanamid which has a specific gravity of about 1.28, a density of about 0.046 lbs./in.$^3$, a compressive strength at 73° F. of about 25,000 p.s.i. and a heat distortion temperature at 264 p.s.i. of about 440° F. Still another polyimide commercially available is that sold under the tradename of Genom 3010 by General Electric and having a specific gravity of about 1.90, a density of about 0.068 lbs./in.$^3$, a compressive strength at 73° F. of about 41,900 p.s.i. and a heat distortion temperature at 264 p.s.i. of about 660° F.

Of the combinations of materials which can be used when making the various parts of the bearing assembly, it has been found that a particularly advantageous combination consists of a first bearing member having a surface made of a body of a polyimide matrix containing fibrous polytetrafluoroethylene in amounts of about 14 weight percent of the total and graphite in an amount of about 15 weight percent of the total and a second member comprising a substrate made of a titanium base alloy including in addition to the titanium, 5 percent by weight of aluminum and 2.5 percent by weight of tin (Ti-5Al-2.5Sn), and a ceramic coating of substantially pure chromium oxide. Substantially the same results are obtained by replacing this titanium base alloy with an alloy including, in addition to the titanium, 6 percent by weight of aluminum and 4% by weight of vanadium (Ti-6Al-4V).

Other advantages being assemblies can be fabricated using a bearing member made of a combination of polyimide with any one of the inorganic additives in the amounts specified above.

A bearing embodying the present invention is shown in the drawing and, by way of example, is shown to be in the form of a spherical bearing incorporated in a rod end. The rod end is comprised of an externally threaded banjo 10 having a transverse bore which receives the bearing, indicated generally at 12. The two coengaging and relatively slidable members of the bearing consist of an inner ball member 14 and an outer member comprised of two separate annular bodies or rings 16, 16. The inner ball member 14 is a composite member and consists of a metallic substrate 18 and a ceramic coating 20. The substrate 18 is of a shape similar to that conventionally used for the ball member of a spherical bearing, it being annular in shape and having a spherical outer surface 22 which receives the ceramic coating 20. The coating 20, as mentioned, has a thickness of less than 0.010 of an inch and has an outer surface 23, conforming to the spherical surface 22 of the substrate, which is lapped or otherwise finished to a very high degree of smoothness. Preferably the finish has a smoothness value of at least 5 RMS or better, although it will be recognized that a smoothness value above 5 RMS can also be employed. A bore 26 extends through the substrate 18 and at each end of the bore the substrate includes an end face 24 arranged perpendicular to the axis of the bore, the end faces 24, 24 therefore forming an annular corner at each end of the bore. In use, the threaded portion of the banjo 10 is threadably connected with one mechanism part and another mechanism part is connected to the inner bearing member 14 by a connecting member inserted through its bore. The end faces 24, 24 are free of the ceramic coating 20 and constitute surfaces against which washers or other retaining means may be tightly pressed for fixing such another part to the bearing during use thereof. It will therefore be noted that clamping forces which are applied between the end faces 24, 24 are resisted directly by the metallic substrate 18 and are not transmitted to any appreciable degree to the material of the ceramic coating 20. Damaged to the ceramic material by the forces exerted on the inner member by the retaining means is therefore avoided.

The outer bearing member of the bearing 12, made up of the two annular bodies 16, 16 includes an internal spherical bearing surface 28 which engages the outer surface 23 of the ceramic coating on the inner member 14. The two rings or annular bodies 16, 16 are comprised at least in part of a solid, organic lubricant material, and preferably comprised of polytetrafluoroethylene fiber of a polyimide matrix containing PTFE fiber or graphite fiber. These two rings 16, 16 are held in place by a retainer 30 having two radially inwardly directed flanges 32, 32 engaging opposite side surfaces of the rings and having two other flanges 34, 34 which are swaged radially outwardly against inclined annular seating surfaces on the banjo 10 to hold the retainer in the banjo. Through the coengaging spherical bearing surfaces 23 and 28, the inner member 14 is free to move in a universal manner relative the ring members 16, 16. In this type of bearing, it is therefore impossible to exert high bending or shear loads on the inner member 14 as a result of misalignment, and because of this the ceramic coating is particularly well suited to this type of bearing, insofar as deformation of the coating due to high bending or shear loads is avoided.

The illustrated bearing is, however, designed to handle relatively high radial loads which, during movement of the inner member relative to the outer member, produce tensile stresses in various portions of the inner member 14. The fact that the inner member 14 is comprised almost entirely of a high strength metal, and includes only a thin ceramic coating, allows the metal to react or absorb the tensile stresses without any high unit stresses being applied to the ceramic coating, the coating thereby being protected against damage by such stresses. Furthermore, the ceramic coating is of such a thickness as to be capable of deforming slightly with deformation of the substrate to allow transfer of stresses which would otherwise be built up in the coating to the substrate, the coating thickness ranging between 0.0005 and 0.010 of an inch and preferably about 0.004 of an inch. The material of the substrate has a tensile strength falling within the range of 35,000 to 250,000 p.s.i.

The inner member 14 of the bearing shown in the drawing was made by the following process which is set hereforth in further explanation of the details of the bearing construction: A substrate or metal ball member was made by machining titanium alloy rod (Ti-5Al-2.5Sn) into a spherical shape having an approximate diameter of 0.005 to 0.010 inches under the final desired ball diameter and a surface finish of approximately 125 RMS. The bore and the two flat end faces were also machined at this time and the rod used was one previously annealed to a hardness of 30Rc to 40Rc and having a tensile strength of approximately 120,000 p.s.i. Masks were then applied to the end faces and thereafter the surface of the ball was roughened by vapor blasting to provide better adherence for the coating. The spherical surface of the ball was then coated with a layer of chromium oxide ($Cr_2O_3$) to a thickness of 0.005 to 0.010 inch, the coating being applied by plasma spray gun equipment. After coating, the final spherical shape, surface finish and diameter were established by a lapping process, the resulting thickness of the finished coating being in the range of 0.0025 to 0.005 inches.

As an alternative to roughening the surface of the ball prior to applying the coating by a vapor blasting technique, this same effect can be achieved by other conventional methods such as by grit blasting or the like.

What is claimed is:

1. A self-lubricated bearing assembly comprising two bearing members having coengaging surfaces which are movable relative to one another, the surfaces of one of said members consisting essentially of a solid polymeric organic lubricant material selected from the group consisting of polyimide and polytetrafluoroethylene and the surface of the second of said members being provided by a body of ceramic material selected from the group consisting of aluminum oxide, chromium oxide, ttanum dioxide, tungsten carbide, titanium carbide, chromium carbide and their mixtures, said body of ceramic material comprising a coating having a thickness ranging from [0.005] *0.0005* to 0.01 inch on a metallic substrate having a tensile strength ranging from 35,000 to 250,000 p.s.i., said metallic substrate consisting essentially of a metal selected from the group consisting of titanium, titanium base alloys, ferrous alloys, aluminum and aluminum base alloys.

2. The self-lubricated bearing assembly of claim 1 wherein the solid organic lubricant material is polyimide containing 14 weight percent polytetrafluoroethylene fibers and 15 weight percent graphite.

References Cited

The following references, cited by the Examiner, are of record in the patented file of this patent or the original patent.

UNITED STATES PATENTS

| | | | |
|---|---|---|---|
| 3,535,005 | 10/1970 | Orkin et al. | 308—241 |
| 3,535,005 | 10/1965 | Zink | 308—238 |
| 3,421,969 | 1/1969 | Roode et al. | 308—238 |
| 3,056,709 | 10/1962 | Rising | 308—Dig. 7 |
| 3,151,015 | 9/1964 | Griffith | 308—Dig. 7 |
| 3,535,006 | 10/1970 | Orkin et al. | 308—241 |

CHARLES J. MYHRE, Primary Examiner

R. H. LAZARUS, Assistant Examiner

U.S. Cl. X.R.

308—72, 241 Dig. 7